UNITED STATES PATENT OFFICE.

HANS BARDT, OF SANTIAGO, CHILE, ASSIGNOR TO SOCIEDAD HIDRO-METALURGICA, OF SANTIAGO, CHILE, A CORPORATION OF CHILE.

PROCESS FOR PRECIPITATING METALS FROM SOLUTIONS.

1,423,070.  Specification of Letters Patent.  Patented July 18, 1922.

No Drawing.   Application filed September 17, 1921.  Serial No. 501,419.

*To all whom it may concern:*

Be it known, that I, HANS BARDT, citizen of Germany, residing at Santiago, Chile, have invented certain new and useful Improvements in Processes for Precipitating Metals from Solutions, of which the following is a specification.

The invention relates to a process for precipitating metals from solutions of their salts and at the same time regenerating the acid with which a metal is combined.

Heretofore there existed three methods for recovering metals from their salt solutions, i. e., (1) electro-deposition using insoluble anodes; (2) precipitation by other metals having a higher electrode potential than the metal which is to be precipitated from its salt solution; and finally, (3) partial precipitation with sulphurous acid, especially of copper applying pressure.

By the electro-deposition with insoluble anodes, equivalent quantities of free acid or halogens (equivalent to the metal precipitated) may be recovered; the high consumption of electric energy, however, renders the process costly and the complicated electrolytic plant necessary needs extraordinary painstaking attention in order to assure its running satisfactory.

Moreover, in case of salts of other foreign metals (for example, iron and arsenic) being present in considerable quantities, such impurities injuriously effect the process as regards the quality of the metal precipitated and also the consumption of energy, and, therefore, these foreign metals have to be eliminated at great expense and by complicated methods, if the solution becomes charged with these foreign salts beyond a certain limit.

In employing the method of precipitating metals from their salt solutions by other more electro-positive metals, (for example, of precipitating copper from its salt solutions with iron or zinc, in the form of cement copper; or silver by using copper or zinc as precipitants, etc.,) the acid is lost in quantities equivalent to the metal with which it was combined and the precipitant destroyed; besides, the precipitated metal is never pure, always containing certain quantities of the metal which served as precipitating agent.

The method of precipitating with sulphurous acid (which has been proposed especially for copper, where, besides metallic copper, always equivalent quantities of copper sulfite are produced) has not been, up to now, put into practice on an industrial scale, on account of the difficulties which present themselves when it is attempted to introduce into the precipitating vats such large quantities of sulphurous anhydride in a sufficiently concentrated form to meet the requirements.

Extension experiments have shown that metals (for example, copper, silver, mercury, gold, etc.,) can be precipitated from their salt solutions and obtained in a completely pure state, treating such solutions with organic substances containing polysaccharides, viz., saw-dust, straw ¡or other vegetable matter (as for instance the waste liquors which are produced in the manufacture of cellulose) sugar, molasses, etc., under pressure exceeding atmospheric pressure and applying heat.

The metal thus precipitated is obtained as a fine powder which collects at the bottom of the precipitation-vessel and can be separated by filtration from the remaining liquid, together with any undecomposed rest of the precipitating agent, as for example cellulose, and melted in an adequate furnace, whereby the adherent cellulose prevents, at the same time, oxidation of the metal. The filtrated liquid can be used for dissolving further quantities of metal.

The following example may serve to illustrate the process:

To a solution containing 5 to 6 per cent Cu. some sawdust (air dry), per kilogramme of copper dissolved, is added and the mixture exposed to a pressure of about five atmospheres, at a temperature ranging from about 120 to 150 centigrade, during half an hour, more or less, when the copper will have been precipitated in a metallic state and chemically pure. It can be filtered, washed and melted down in an adequate furnace.

Patent claims:

1. The process for recovering by precipitation metals from their solutions characterized by the treatment of metallic salt solutions with organic substances containing poly-saccharides under pressure and at a temperature exceeding 100 degrees centigrade.

2. The process for recovering metals from their solutions by precipitation characterized by the treatment of said solutions with pressure at a temperature above 100 degrees centigrade in the presence of poly-saccharides.

In testimony whereof I affix my signature.

HANS BARDT.

Witnesses:
WALTER J. TINGLE,
AL ARMEKER.